Dec. 26, 1944.  W. F. PENROSE  2,365,726
ELECTROMAGNETICALLY ACTUATED BRAKE
Original Filed Feb. 28, 1940  2 Sheets-Sheet 1
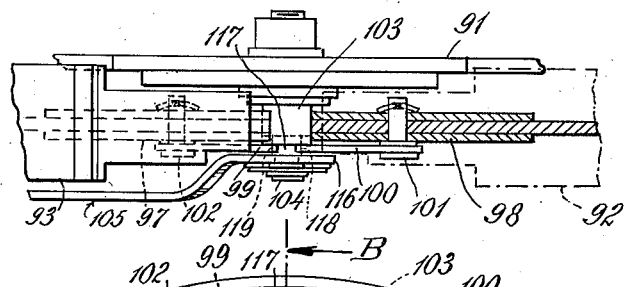
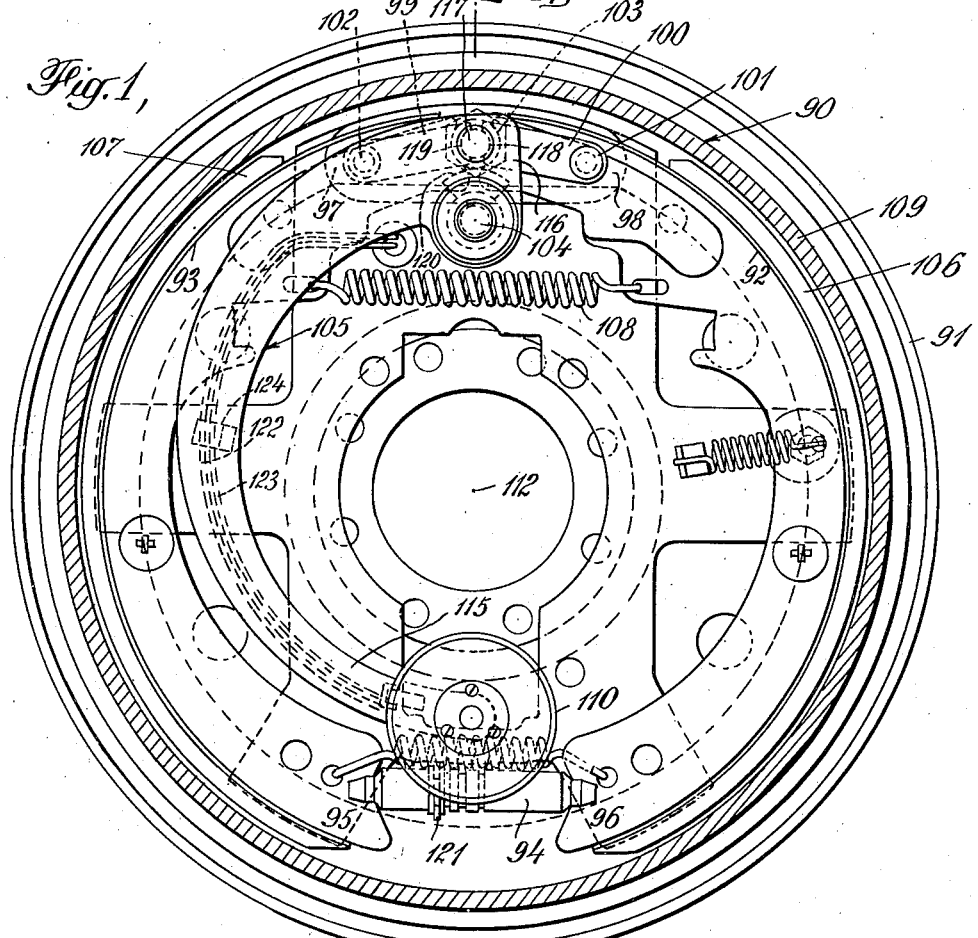
INVENTOR
William F. Penrose
BY
Pennie, Davis, Marvin and Edmonds
ATTORNEYS Dec. 26, 1944.    W. F. PENROSE    2,365,726
ELECTROMAGNETICALLY ACTUATED BRAKE
Original Filed Feb. 28, 1940    2 Sheets-Sheet 2

Patented Dec. 26, 1944

2,365,726

UNITED STATES PATENT OFFICE 2,365,726

ELECTROMAGNETICALLY ACTUATED BRAKE

William F. Penrose, Irvington, N. J., assignor to Empire Electrical Brake Corporation, a corporation of Delaware Original application February 28, 1940, Serial No. 321,169, now Patent No. 2,273,065, dated February 17, 1942. Divided and this application September 29, 1941, Serial No. 412,719

3 Claims. (Cl. 188—78)

This invention relates to brakes and has for its object the provision of an improved brake and brake assembly of the two-shoe single-anchor self-energizing articulated type particularly adapted to be electromagnetically actuated by the electromagnet and lever combination described in my application filed February 28, 1940, now Patent No. 2,273,065, of which this is a division.

Various features of novelty of the invention relate to the general arrangement of the parts, to the construction and arrangement of the brake shoes in articulated relationship with an adjusting member and the provision at the oppositely disposed operating ends of links pivotally connected to the brake shoes respectively, through which selective actuation may be effected, all of which will be apparent from the following description of a preferred embodiment illustrated in the accompanying drawings, in which:

Fig. 1 is a front view of the brake and brake assembly, partly in section, showing the arrangement of the two shoes in articulated relation and the disposition thereof with respect to the single anchor;

Fig. 1a is a top view of a portion of Fig. 1 showing the arrangement of the link members actuating the operating ends of the brake shoes.

Figure 2:
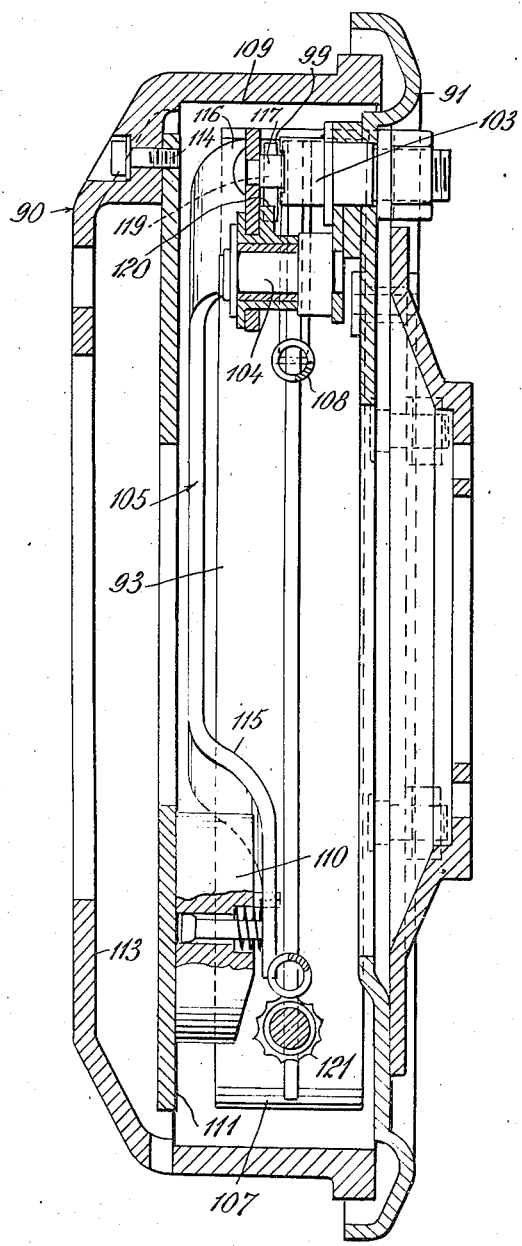
Fig. 2 is a side view, in section, taken along BB of Fig. 1.

Referring now to the drawings, the brake drum 90 forms part of the rotating wheel of a vehicle and the non-rotatable support or backing plate 91 is affixed upon the axle thereof in a conventional manner. The various adjacent parts of the wheel and axle of the vehicle are not shown as they form no part of the present invention.

The two brake shoes 92, 93 are articulated with the adjusting member 94 at the ends 95, 96 thereof. The oppositely disposed operating ends 97, 98 of the brake shoes 92, 93 are adapted to be selectively actuated through links 99, 100 pivotally connected to the brake shoes 92, 93 by pins 101, 102. In retracted position the brake shoes 92, 93 engage the adjustable anchor pin 103 carried by the backing plate 91, which pin serves as a hanger for the brake shoes. The lever pivot pin 104 is also supported from and movable with the anchor pin 103. The lever 105 is pivoted about the pin 104.

Brake lining portions 106, 107 are affixed to the outer surfaces of the brake shoes 92, 93. A coil spring member 108 provides tension between the operating ends of the brake shoes 92, 93 to hold the brake in the retracted position shown in Fig. 1.

The actuating means for controllably applying the brake shoes 92, 93 in braking engagement with the flange portion 109 of the drum 90 comprises the electromagnet 110-lever 105 combination pivoted at the pin 104, and the disc-like flat-face armature plate 111 with its face perpendicular to the drum axis 112, affixed to the web 113 at several spaced points as at 114.

The lever 105 swings about the pivot pin 104 and comprises a relatively long arm 115 extending curvedly and offset to pass around the axis 112 to the electromagnet 110 disposed at a point substantially more than 90° from the pivot pin 104, and a short arm 116 carrying pin 117 which extends between the ends of the links 99, 100. The ends of the links 99, 100 are shaped as at 118, 119 to closely abut each half circumference of the pin 117 when the brake shoes 92, 93 are in the retracted position.

The pin 117 depending upon the direction of movement of the lever 105, selectively actuates one or the other of the operating ends 97, 98 of the brake shoes 92, 93 through the then operating link. Assuming one direction of armature rotation, the energized electromagnet will be moved to the left in Fig. 1. In this event the pin 117 will move to the right, actuating operating end 98 of brake shoe 92 through the link 100. In so operating the pin 117 will move out of abutment with the link 99. During such movement the end of the link 99 will be supported on the curved surface member 120 so that when pin 117 returns to its normal brake retracted position, the shaped ends 118, 119 of the links will again closely engage each half circumference of the pin 117. During movement of the pin 117 in the opposite direction link 99 will actuate operating end 97 of the brake shoe 93 through the link 99, while link 100 will be supported on the curved surface member 120.

It is to be noted that adjustment of the brake shoes may be readily made within the drum 99 with respect to the flange 109, both at the adjustable anchor 103 carried by the support or backing plate 91, and at 121 of the adjustable member 94.

The electromagnet 110 is supported from within its structure at a plane closely adjacent the working face thereof on the lever arm 115 so as to permit of axial and limited universal pivotal movement with respect to the lever arm 105.

The brake shoes 92, 93 will be applied upon controllably energizing the winding of the electromagnet 110. Leads 122, 123 arranged along the lever arm 115 and held in place by the clamp 124 provide electrical connections from the source of direct-current voltage to the winding of the electromagnet 110.

As should be evident from the foregoing description, the invention may be embodied in different forms other than the preferred embodiment illustrated in the drawings without departing from the gist of the invention as defined in the following claims.

I claim:

1. In an internal brake, the combination of a drum having a flange portion and adapted to rotate about an axis, a non-rotatable support fixedly arranged adjacent said drum, an anchor carried by said support, friction member means having oppositely disposed operating ends between which said anchor extends, a pivot pin supported by said anchor and arranged adjacent the said operating ends of the friction member, a lever pivoted on said pin and having a short arm adapted to actuate said operating ends of the friction member means, said short arm of the lever having a pin member extending between said operating ends, link means pivotally connected on each of the said operating ends of the friction member means and having shaped free ends adapted to engage the said pin member on said short arm when the brake is in the retracted position, said link means being adapted to operatively move the friction member means into braking engagement with the drum flange upon movement of said lever about said pivot.

2. A brake comprising in combination, a drum, a pair of articulated self-energizing brake shoes arranged within the drum and having oppositely disposed operating ends, an anchor extending between the operating ends of the brake shoes and adapted to so function during braking in either direction of drum rotation, links pivotally connected on the operating ends of said brake shoes and presenting oppositely disposed free ends, and means extending between the free ends of said links adapted to selectively engage the same for operatively moving said brake shoes into braking engagement with the drum.

3. In combination with a drum, a brake therefor comprising, two articulated brake shoes having oppositely disposed operating ends, a support fixedly arranged adjacent said drum, an adjustable anchor carried by said support and extending between the operating ends of said brake shoes and providing a hanger for said shoes when in retracted position, means supported from said anchor for actuating the operating ends of the brake shoes including a movable pin member normally disposed in radial alignment with said anchor when said brake shoes are in retracted position, link means pivotally connected on the operating ends of said brake shoes and having free ends adapted to engage said movable pin member on opposite sides thereof, said links being adapted to operatively move the brake shoes into braking engagement with said drum upon displacement of said movable pin member, and means including said anchor for adjusting the position of said shoes, said links and movable pin member in fixed relation as a unit within said drum.

WILLIAM F. PENROSE.